United States Patent
Chen et al.

(10) Patent No.: US 6,731,224 B1
(45) Date of Patent: May 4, 2004

(54) METHOD AND DEVICE FOR PREPROCESSING A RECEIVED, DATA CODED TRANSMITTING SIGNAL

(75) Inventors: Ling Chen, Darmstadt (DE); Wolfgang Fey, Niedernhausen (DE); Olaf Zinke, München (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/555,239
(22) PCT Filed: Nov. 10, 1998
(86) PCT No.: PCT/EP98/07169
  § 371 (c)(1),
  (2), (4) Date: Sep. 8, 2000
(87) PCT Pub. No.: WO99/27675
  PCT Pub. Date: Jun. 3, 1999

(30) Foreign Application Priority Data

Nov. 25, 1997 (DE) .......................... 197 52 063
Feb. 28, 1998 (DE) .......................... 198 08 575

(51) Int. Cl.$^7$ ................................. G01P 3/00
(52) U.S. Cl. ............... 340/870.19; 324/166; 702/148
(58) Field of Search .................. 340/870.19, 178, 340/870.24, 524, 432; 324/207.12, 160, 163, 166; 702/148, 145; 327/75

(56) References Cited

U.S. PATENT DOCUMENTS

| | | | |
|---|---|---|---|
| 3,601,543 A | * | 8/1971 | Maniere et al. ............. 370/438 |
| 4,217,588 A | * | 8/1980 | Freeny, Jr. ................. 342/458 |
| 4,227,181 A | | 10/1980 | Brittain |
| 4,623,876 A | * | 11/1986 | Shima et al. ............ 340/539.1 |
| 4,935,733 A | * | 6/1990 | Munekata .............. 340/825.57 |
| 5,008,647 A | * | 4/1991 | Brunt et al. ................. 340/432 |
| 5,412,698 A | | 5/1995 | Oprescu et al. |

FOREIGN PATENT DOCUMENTS

| | | |
|---|---|---|
| DE | 30 01 331 | 7/1981 |
| DE | 195 35 006 | 4/1997 |
| DE | 196 21 902 | 12/1997 |
| DE | 196 43 410 | 6/1998 |
| DE | 196 50 935 | 6/1998 |
| FR | 2 725 091 | 3/1996 |
| GB | 2 180 712 | 4/1987 |
| GB | 2 240 241 | 7/1991 |

OTHER PUBLICATIONS

Search Report of the German Patent Office for Application No. 198 08 575.3.
Bennett et al.: "Data Transmission", *Inter–University Electronics Series*, vol. 2; 1965; p. 26–31.

* cited by examiner

Primary Examiner—Timothy Edwards
Assistant Examiner—Hung Dang
(74) Attorney, Agent, or Firm—Rader, Fishman & Grauer PLLC

(57) ABSTRACT

A method for conditioning a coded signal including: determining a time constant, on the basis of which the data were coded, from the received signal and evaluating the received signal according to the determined time constant. A device for conditioning a received signal that transmits coded data has a determining device for determining a time constant, according to which the data were coded, from the received signal and an evaluation device for evaluating and processing the received signal according to the determined time constant.

17 Claims, 6 Drawing Sheets

US 6,731,224 B1

METHOD AND DEVICE FOR PREPROCESSING A RECEIVED, DATA CODED TRANSMITTING SIGNAL

TECHNICAL FIELD

The present invention relates to a method and device for conditioning a received signal that transmits coded data.

BACKGROUND OF THE INVENTION

When transmitted coded data is to be conditioned after receipt, the receiving device must have some information regarding how the coding was executed at the transmitting end, so that the signal can be decoded quickly and reliably. Many coding processes are known (e.g. binary, PWM, AM, FM). Since coded data usually are transmitted time-serially, the time base on which the signals were coded has to be known for certain coding processes, e.g. for binary signals or PWM (pulse-width modulation), so that the signals can be decoded correctly at the receiving end.

FR-A-2725 091 discloses a process for synchronizing coded data, wherein a synchronization sequence is sent first so that the recipient can determine the transmission time of the signal, followed by a sequence of initial signals so that the recipient can identify the starting time of the transmission. The process refers to a remote control, in particular a radio remote control for opening the doors of a motor vehicle from a distance. The process is supposed to ensure safe functioning of the remote control, even when it has a relative low output performance and there is electromagnetic interference.

A computer bus system for serial data transmission is described in U.S. Pat. No. 5 412 698, which exhibits an adaptive data separator so as to be able to recognize an optimal time constant from an interfered signal, wherein systematic differences between the arrival of leading and falling signal edges of a digital signal are to be recognized and compensated.

GB-A-2 240 241 describes a system for transmitting data with a certain data rate or frequency, which exhibits an arrangement for determining a time constant for the synchronization of the data rate of a received data signal and an output signal.

Furthermore, GB-A-2 180 712 discloses a system for optical data transmission, in which, on the basis of the coded signal, a synchronization bit at the beginning of every data block with an increased DC voltage level is used to determine the significance of the following data bits on a lower DC voltage level.

In the ITT application "Method and Circuit Arrangement for Transmitting Speed Information and Additional Data" dated Dec. 6, 1996, the transmitting-end shape of a signal that transmits data was disclosed. This was primarily designed for application in the construction of vehicles, in particular for transmitting data from an active wheel sensor to a superior control system. Such a system is illustrated schematically in FIG. 1. A sensor 107 and a brake 108 are attached to a wheel 106. The sensor 107 is an "active" sensor, which means that it not only changes incoming electric signals (voltage or current), but also actively shapes signals in order to transmit information from wheel 107 to a superior device 101. The sensor 107 is connected to device 101 by means of a line 105, and the line 105 may consist of several individual lines. The sensor transmits diverse information about the wheel. At first information on the wheel speed should be transmitted. Then other information can be transmitted, e.g. temperature, wear of brake shoes or similar things. Since, on the one hand, the sensor 107 is located in a comparably "rough" environment, i.e. directly on the wheel (vibrations, temperature fluctuations, moisture) and, on the other hand, the wiring is to be kept as simple as possible so that it is less susceptible to defects, the data transmitting process has to be designed in such a way that it works reliably despite the above-described adverse conditions.

The system in FIG. 1 shows a device for conditioning a received signal that transmits coded data 104, which is designed according to the present invention and is located in the control device 101. This is followed by a decoding device 103 and a control system 102 that, according to the signals received (also additional, not shown input signals), on the one hand provides control data for the wheel under review and on the other hand generates other data, e.g. alarms for alarm devices 111 or similar things. The control system 102 can deliver electric control signals to a brake control system 110, which in turn acts on the wheel brake 108 via a hydraulic line 109.

The signal generated in the active sensor 107 and transmitted to the device according to the invention 104 by way of line 105 can be shaped in the way described in the above-mentioned ITT application. Individual data sequences are explained on the basis of FIG. 3. FIG. 3a shows an ideal sequence, whereas FIG. 3b–d show real sequences. The signal generated by sensor 107 exhibits different pulses, i.e. wheel pulse 301 and subsequent data pulses 303. Preferably the wheel pulse 301 has a higher amplitude than one of the data pulses 303. The sequence of a wheel pulse 301 and data pulses 303 is provided periodically. Then the wheel speed can be determined through the intervals between the consecutive wheel pulses. A suitable number of data impulses 303 is transmitted between consecutive wheel pulses 301; these transmit additional information, e.g. coded in binary form, from the wheel to the device according to the invention.

When the wheel is standing still and the speed consequently is zero, the wheel pulse 301 is replaced by an auxiliary pulse 304. The auxiliary pulse 304 preferably has an amplitude that is lower than that of the wheel pulse 301 and in particular equal to that of the data pulses 303. Thus it can be differentiated from the wheel pulse 301. The auxiliary pulse 304 can be differentiated from data pulses 303 because the auxiliary pulse 304 occurs non-synchronized "out of thin air", whereas the data pulses 303 are sent immediately afterwards.

During high speeds, the case shown in FIG. 3c may occur. Here a new wheel pulse 301' is generated before the transmission of the data pulses 303, 303' was completed. This presents no problem as far as the wheel pulse 301, 301' is concerned, since it can be recognized by its high amplitude. Thus the speed information is transmitted. In the case shown in FIG. 3c, the usage or evaluation of the data can be stopped according to pulses 303, 303'. When the wheels are standing still, the case shown in FIG. 3c cannot occur, since the interval between the auxiliary pulses 304 is freely selectable, i.e. the interval between them is selected in such a way that all data pulses 303 can be transmitted between two auxiliary pulses 304.

The case shown in FIG. 3 illustrates a binary data transmission: each of the data pulses 303 correspond to one bit, which can be either 1 or 0. They are marked with 1 only for reasons of clarification. The bits follow one another at a certain interval of time tp. They must be sampled at the receiving end to be evaluated and decoded, so that their respective value is known. Thus, it must be known at the receiving end which time base was used for coding the data. This may become a problem when, as described above, the transmitter is used in a rough environment and the time base applied for the coding may be displaced due to the changing environmental influences. In this case, a fixed time base cannot be assumed. Instead the time base may vary, making it necessary to provide it to the transmitter from one case to another.

The above problem was described on the basis of an application in vehicle construction. It may also arise in other applications.

It is the object of the invention to disclose a method and device for conditioning a received signal that transmits coded data, with which the transmitted data can be decoded reliably.

According to the invention the data are transmitted together with information on the time base or time constant, on the basis of which the coding was carried out. At the receiving end this information about the time base or time constant is determined and the further evaluation of the data that was received is executed according to this information. Preferably the information concerning the time constant is transmitted at the beginning of the transmission. Then the information regarding the time constant also can be determined at the beginning of the evaluation, so that always the latest information can be used for evaluating the following data. In connection with "frequently" repeated pulse curves, however, the information on a time constant obtained in a previous cycle can be used for a subsequent cycle. The obtained time constant, for example, may correspond to a bit period in the signal received or at least allow conclusions as to the bit duration when the coding was binary, for example by means of a proportional relationship. In connection with pulse width modulation the time constant obtained may refer to a mean pulse duration or similar.

DETAILED DESCRIPTION OF THE PREFERRED EMBODIMENTS

Figure 1:
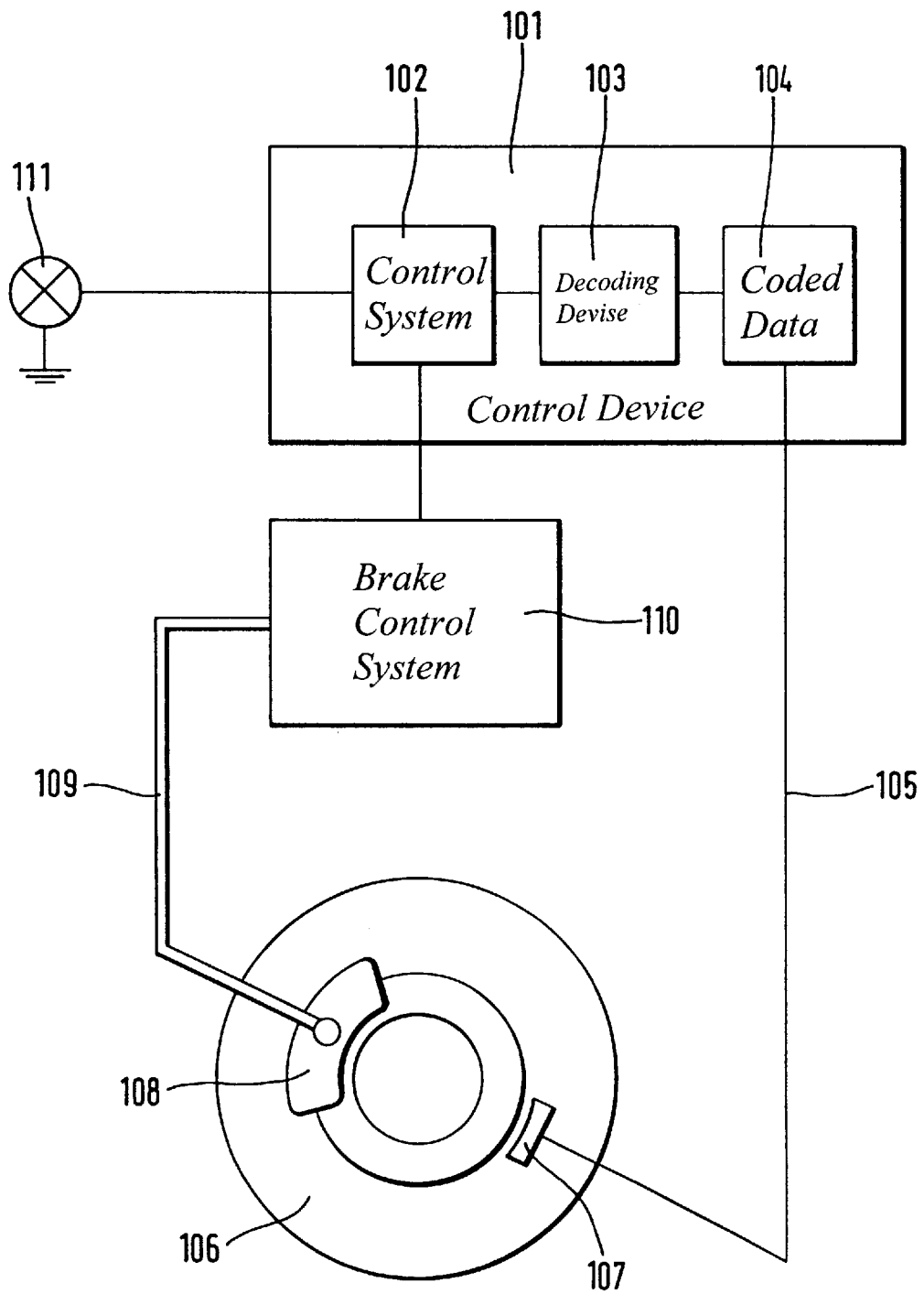
FIG. 1 is a schematic drawing of the environment in which the signal conditioning device of the present invention is implemented.
Figure 2:
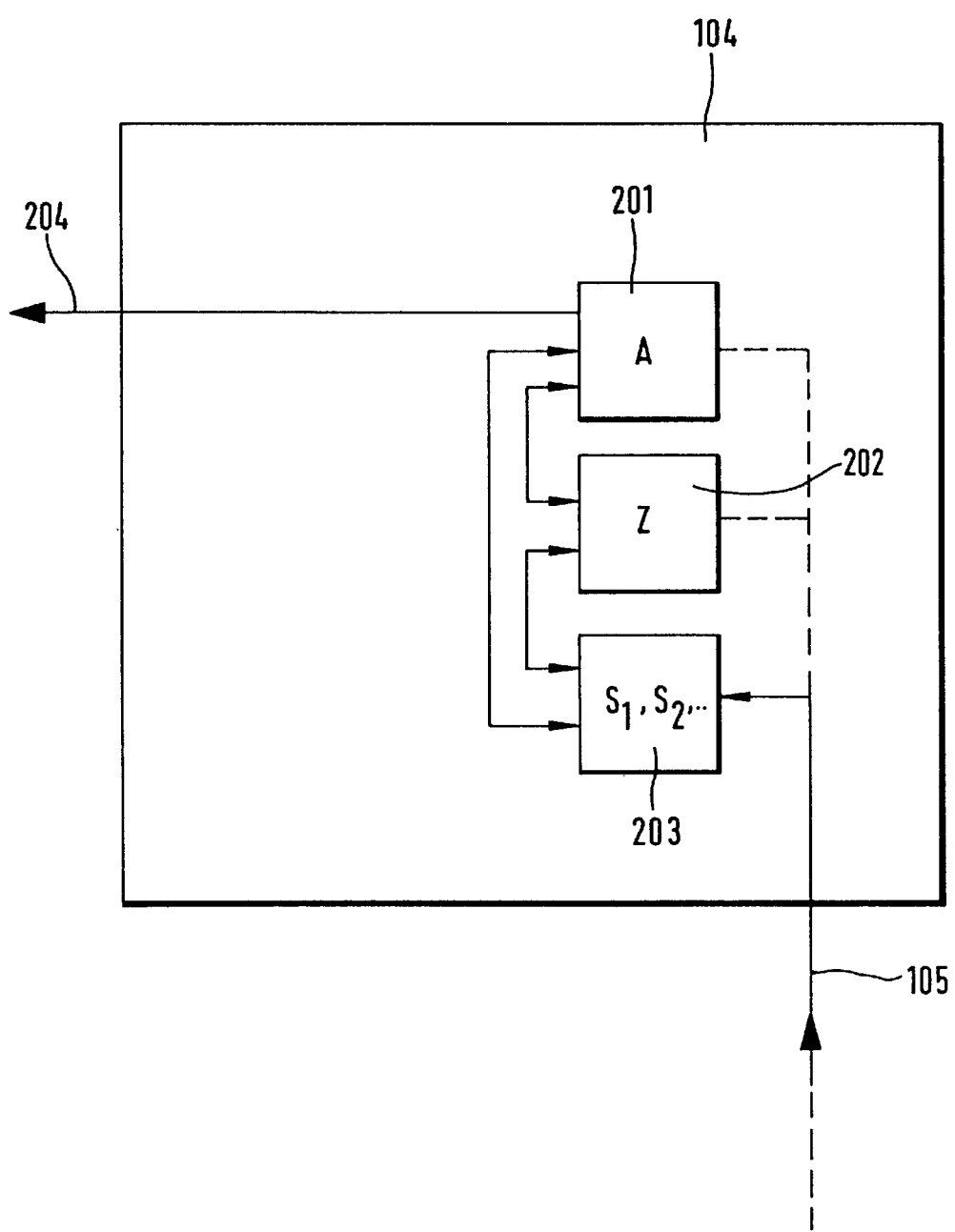
FIG. 2 is a simplified block diagram of block 104 of FIG. 1.

FIG. 2 shows an embodiment of the device for conditioning a received signal that transmits coded data according to the invention. It receives the signal via line 105. This signal can be supplied to various components 201, 202, 203, if necessary. 202 is a determining device for determining the above-mentioned time constant. On the basis of the signal coming in via line 105, the determining device 202 can be determine the time constant and, if necessary, provide it to other components. 201 is an evaluating device that evaluates the signal received via line 105, with this being a preliminary evaluation or conditioning within the meaning of this application. For example, the evaluating device 201 can be a sampling device for binary coded signals, which cyclically samples the received signal. The evaluating device 201 would then set the cycle time of the sampling according to the time constant determined by the determining device 202. A similar manner of proceeding would occur for pulse width modulation. 203 is a detection device that observes the amplitude of the incoming signal and categorizes the signal according to threshold values.

Figure 3:
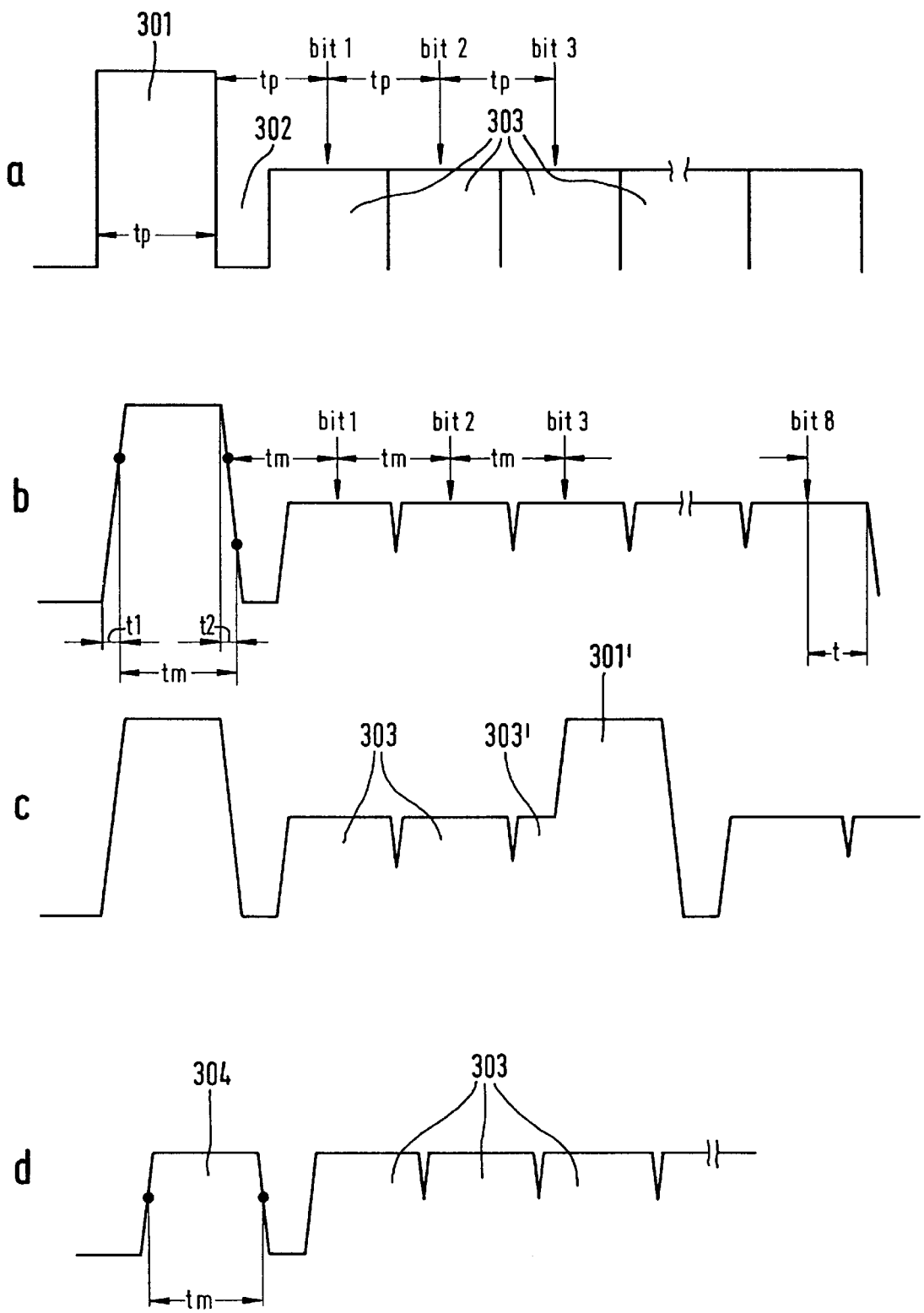
FIG. 3a depicts an ideal data sequence.
FIGS. 3b–3d show actual data sequences.
Figure 6:
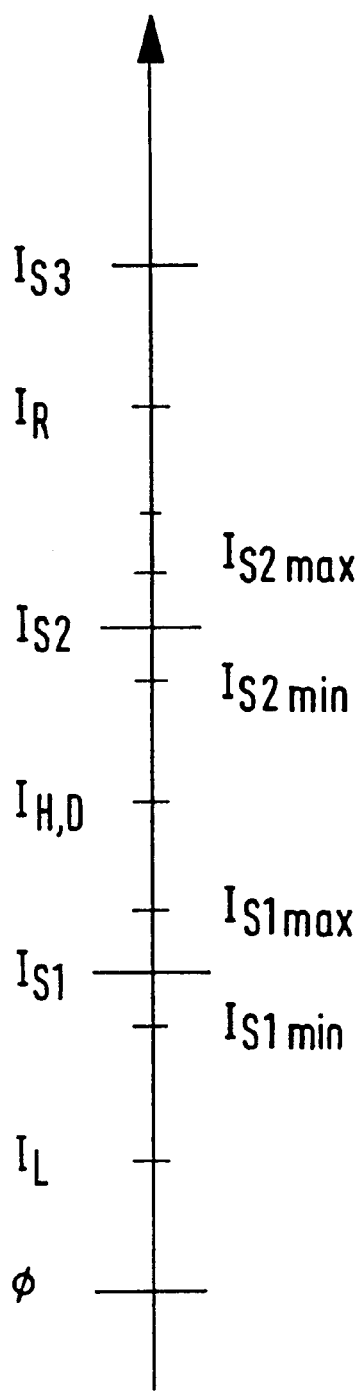
FIG. 6 is a short shoeing the various threshold current values used by the detection device.

FIG. 6 is a schematic representation of such threshold values as those used by the detection device 203. In the example shown, it is assumed that the different pulses are characterized by different current values. An auxiliary pulse 304 or data pulse 303 in FIG. 3 is identified when it lies between a first threshold value IS1 and a second threshold value IS2. If a current value is higher than the second threshold value IS2, it is identified as a wheel pulse. If the current is greater than a third threshold value IS3, which in turn is greater than the second threshold value, an error is inferred. A current value lying below the first threshold value IS1 will not be recognized as a pulse. It may be fundamental-frequency current $I_L$ which serves to supply energy to the active sensor 107. Consequently, the detection device 203 categorizes the incoming signal and forwards corresponding information to the determining device 202 and the evaluation device 201. The evaluation device 201 in turn can generate a digital signal whose—buffered if necessary—amplitude and pulse frequency are adapted to the other system requirements. Line 204 is used to output it to downstream components which can decode and process further the signal.

Figure 4:
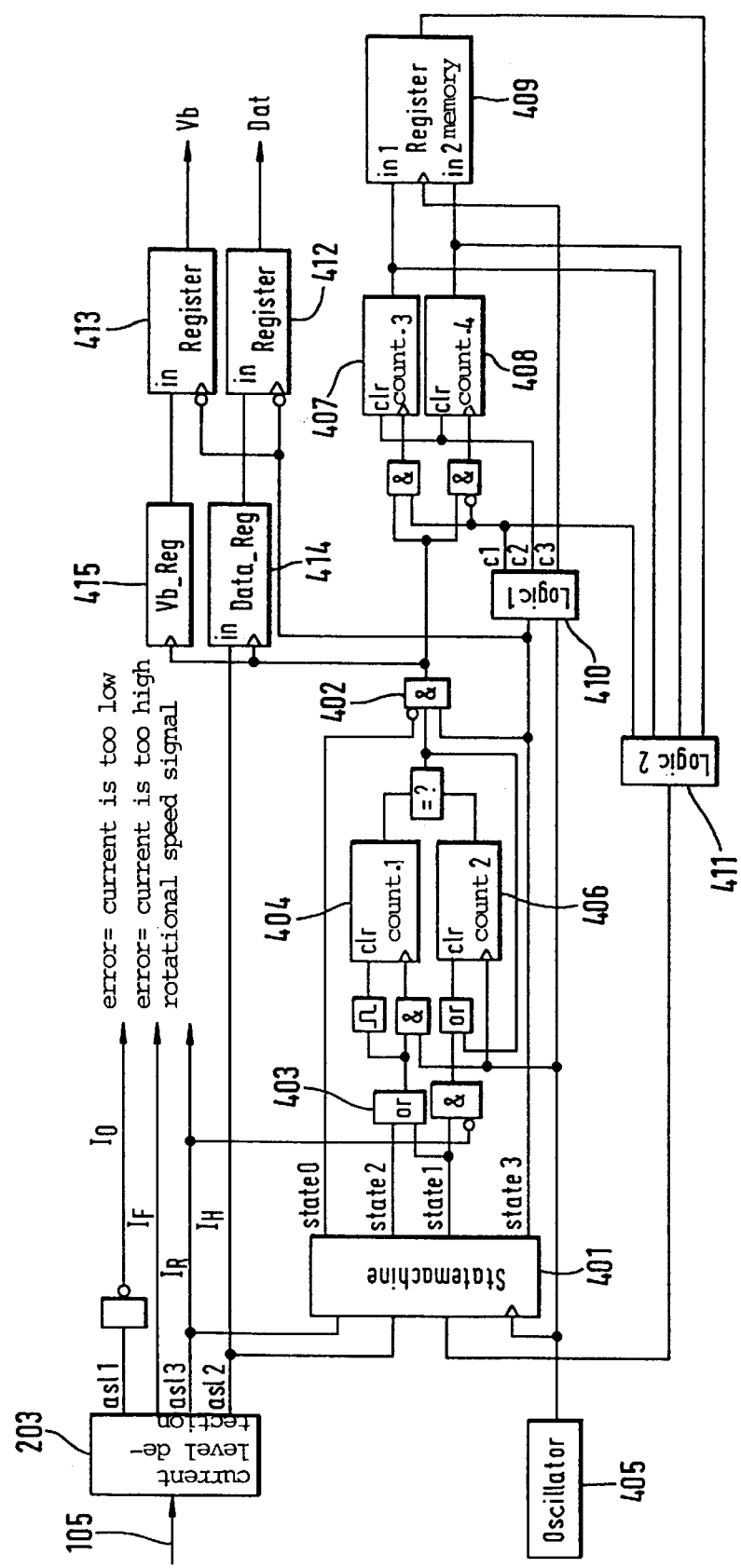
FIG. 4 is a detailed schematic of a state machine implementation of the detection device 203 of FIG. 2.
Figure 5:
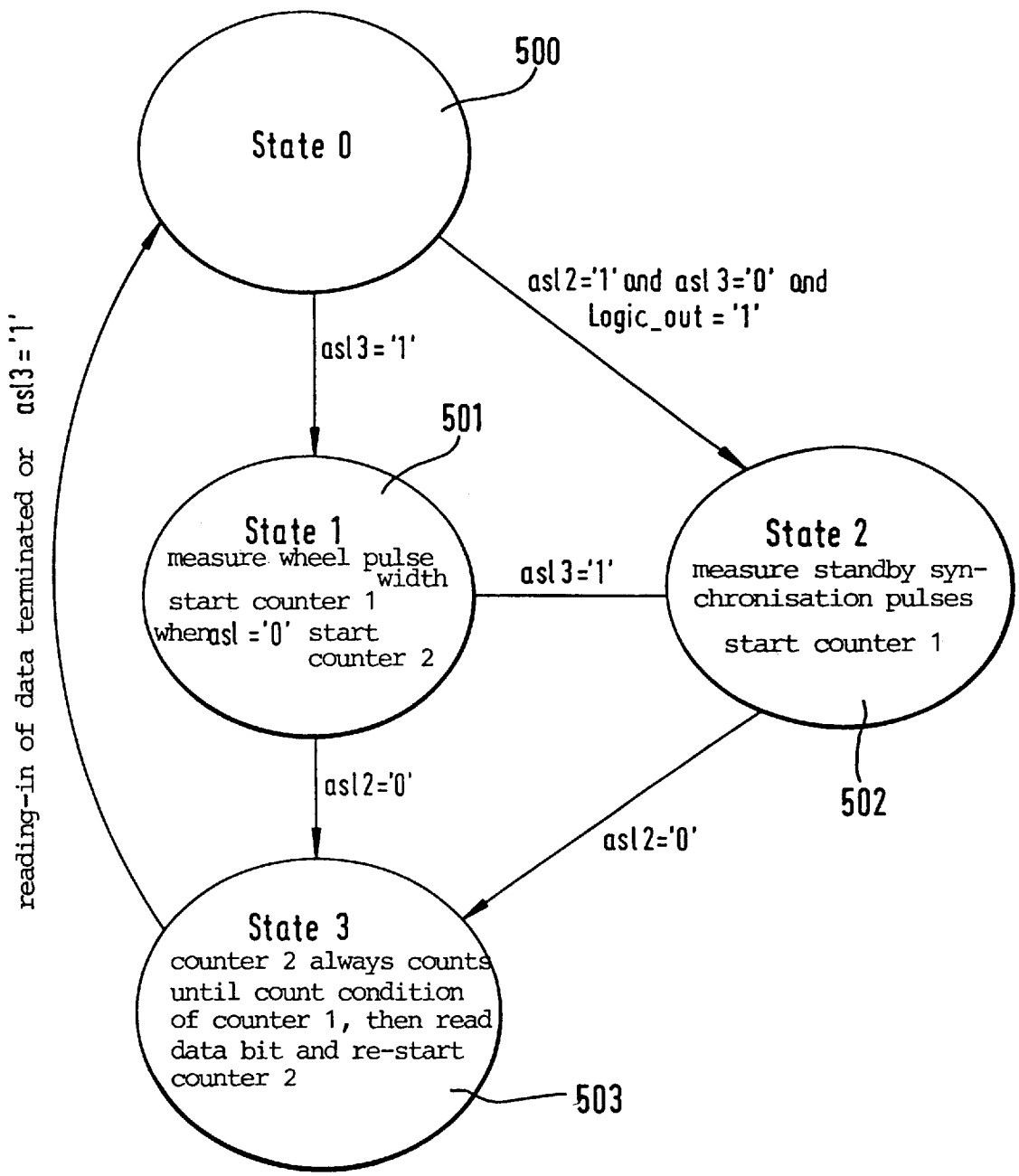
FIG. 5 is a logic flow diagram of the state machine of FIG. 4.

FIG. 4 shows a more concrete embodiment. Amongst other things, the concept of a "state machine" has been realized here. Before the circuit in FIG. 4 is explained in more detail, the mode of functioning of the "state machine" is described on the basis of FIG. 5.

Before a wheel pulse 301 or 304 is received, the circuit is in an idle state 500 (state 0). It isn't receiving any data or carrying out any special operations. As soon as a leading edge is detected (because the current exceeds beyond the first threshold value IS1) it changes over to state 2 (502), where it begins measuring an auxiliary pulse 304. If the second threshold value IS2 also is exceeded, it changes over to state 1 501, where the pulse width of the wheel pulse 301 is measured. It may also be that the level increases so quickly that the rise above the first threshold value IS1 is not detected separately from the rise above the second threshold value IS2. Then the circuit changes directly from state 0 500 to state 1 501. If the current drops below the first threshold value again, it changes over to state 3 503, where the conditioning of the received data pulses 304 is initiated. When this is completed, the circuit changes back to state 0 500. Thus, the transitions from one state to another basically occur on the basis of the threshold decisions.

Preferably the time constant is determined by measuring the pulse width of a pulse, preferably the first pulse of a received sequence of pulses. At the transmitting end the first pulse would then have to be formed and sent in such a way that it can be used as the measure for the time constant. This is compatible with the pulse sequences shown in FIG. 3, since the first pulse has to be detected only qualitatively there and, hence, its pulse duration is not determined yet; thus, the pulse duration can be used for transmitting the time constant. FIG. 3a shows the ideal case of ideal rectangular shapes. The pulse width tp, for example, can then be obtained by counting the state during which the pulse is at a high level. FIGS. 3b–d show real pulse forms with finite steep edges. The different pulses (idle=302, data or auxiliary pulse=303, 304, wheel pulse=301, error) can be differentiated by different threshold values IS1, IS2, IS3. Real pulses can be measured in such a way that the measuring is initiated when the current rises above a threshold value and is terminated when the current falls below another threshold value. Preferably the measurement of an auxiliary pulse begins when the current rises above the threshold value IS1 that differentiates the auxiliary pulse level from the idle level. The measurement of a wheel pulse preferably is initiated when the current rises above the threshold value IS2 that differentiates the auxiliary pulse from the wheel pulse. Preferably the measurement of the pulse width of the first pulse is terminated when the current falls below the threshold value IS1 that differentiates the auxiliary pulse from the idle state. In this connection, it is assumed that the signal is formed in such a way that another, very low current level 302 is input between the end of the wheel or auxiliary pulse 301, 304 and the first data pulse 303.

The circuit in FIG. 4 is a detailed representation of the device 104 and, in particular, the detection device 203. The latter has four outputs which mark four different levels, and it is possible to apply a pulse arrangement as described on the basis of FIG. 3. 401 is the "state machine" that receives the relevant level signals from the detection device 203 and, in particular, activates individual circuit components according to their variation. In this way definite evaluation results can be obtained. When a current rise exceeding beyond IS1 is detected in state 0 500, the line state 2 sets itself to logical 1, counter 404 is started to measure the width of the auxiliary pulse 304, with the counter counting the clock pulses of an oscillator 405. If the current continues to rise beyond threshold value IS2, the evaluation changes to state 1 501, so that the corresponding line is set to logical 1. The counter 404 is reset and started anew to measure the width of the wheel pulse 301. The counter stops counting when the current has fallen below the first threshold value IS1.

After (in state 2) an auxiliary pulse or (in state 1) a wheel pulse was measured, the system changes to state 3. Here the sequential sampling of the data pulses is carried out according to the received time constant and, in particular, according to the count of counter 404. Counter 406 always runs up to the count of counter 404 (or up to a value obtained according to this count); when the counts of both counters are equal, the received signal is sampled and the obtained value is used as digital zero or one value. Then counter 406 is reset and started again. The sampling continues until it is determined on the basis of further decision criteria that no more data can be read. Preferably the decision regarding the quantity of data still to be read is carried out according to the same criteria as the decision about the quantity to be sent is made in the transmitter. Then the system changes to state 0 and waits for the next pulse.

In the evaluation circuit shown in FIG. 4, counters 407 and 408 as well as register memory 409 are used for carrying out the decision criteria. Logic 411 checks whether the calculated number of data bits has been read.

The circuit according to FIG. 4 contains a data register 412, in which the data that was read is buffered. In addition, it contains a register 413 for validity bits, in which validity bits allocated to the individual data bits are stored, for example, to be able to mark bits invalid—corresponding to 303' in FIG. 3c. Corresponding shift registers 414, 415 can be arranged upstream of the registers 412, 413.

The embodiment according to FIG. 2 and FIG. 4 is particularly well suited for structuring signals according to FIG. 3a (ideal signal), where a pulse break 302 that corresponds to a fraction of the pulse width of the wheel or auxiliary pulse is inserted at the transmitting side between the wheel pulse 301 (or auxiliary pulse 304), with such pause preferably amounting to 50% of the pulse width. Then, following the wheel or auxiliary pulse, its pulse width tp can be used immediately as the period for sampling the individual following bits. Ideally every bit is sampled at its respective time-related middle point.

Since, on the one hand, the rise times of the electric values are finite and, on the other hand, both the actual amplitudes and the threshold values used for the decision or measurement are subject to variations, these variations may cause the determination of the time constant to be inaccurate, too. It must also be taken into consideration that an error (albeit a small one) in the determination of the time constant cumulates in the course of sampling a digital signal that consists of many time-serial bits, because the error is not distributed statistically, but always acts in the same direction. For example, an error of 2% causes the sampling time to be shifted by half a bit width after sampling 25 bits.

The above-mentioned variations are indicated in FIG. 6. Thus, the threshold values IS1 and IS2 may vary up to IS1max, IS1min, IS2max, IS2min. Correspondingly, the same holds true for the respective current levels $I_R$, $I_{H,D}$, $I_L$.

Thus, concepts that take into consideration the amplitude and time inaccuracies can be used to determine how many bits can still be reliably transmitted or evaluated. These concepts can be determined in particular by taking into consideration the edge steepness (dimension A/s for current pulses) of the pulses. For example, the following relationships apply, with these being based on the assumption of eight bits after a wheel or auxiliary pulse:

$$t1 = \frac{IS2 - IL}{ktr}$$   ktr: Steepness of the leading edge of the wheel pulse (absolute value)

$$t2 = \frac{IR - IS1}{ktf}$$   ktf: Steepness of the trailing edge of the wheel pulse (absolute value)

$$tm = tp - t1 + t2$$   tm: measured pulse duration, duration of the wheel pulse $$t_{bit8}tp + \frac{IR - IS2}{ktf} + 8*tm$$

$$t = 9.5 * tp - t_{bit8}$$

$$= 8.5 * tp - \frac{IR - IS2}{ktf} - 8 * tm$$

$$= 8.5 * tp - \frac{IR - IS2}{ktf} - 8 * tp + 8 * t1 - 8 * t2$$

$$= 0.5 * tp - Ir - IS2ktf + \frac{8*(IS2 - IL)}{ktr} - \frac{8*(IR - IS1))}{ktf}$$

$$t_{max} =$$

$$0.5 * tp - \frac{IR_{min} - IS2_{max}}{ktf_{max}} + \frac{8*(IS2_{max} - IL_{min})}{ktr_{min}} - \frac{8*(IR_{min} - IS1_{max}))}{ktf_{max}}$$

$$t_{min} = 0.5 * tp - \frac{IR_{max} - IS2_{min}}{ktf_{max}} +$$

$$\frac{8*(IS2_{min} - IL_{max})}{ktr_{max}} - \frac{8*(IR_{max} - IS1_{min}))}{ktf_{min}}$$

$t_{max}$ or $t_{min}$ convey information about the cumulated error of the sampling time during the last (eighth) bit as compared to the theoretically desired value in view of the coding. Thus, concepts corresponding to the ones mentioned above allow a conclusion as to whether the desired quantity to be transmitted is permissible or how many data can be transmitted.

The signal structuring to be handled according to the present invention preferably is such that the wheel pulse 301 has a higher amplitude than the auxiliary pulse 304, but essentially the same duration tm. In addition, the data pulses 303 preferably have this duration tm as well, with the time-related middle point of the first data pulse 301 coming after the end of the wheel or auxiliary pulse 301, 304 (lowest value or when the current falls below a corresponding threshold value) after about the pulse width of these pulses.

A coding system in which binary data were coded, preferably by current amplitudes, was described on the basis of FIG. 3. However, the device and method according to the invention also are suitable for transmitting systems where binary data can be coded through the existence or lack of an edge during the observation period. Here, too, a time base is used for the coding, and it is transferred at the beginning of the data transmission through the duration of the wheel or auxiliary pulse and then can be used by the recipient for conditioning the signal.

What is claimed is:

1. A method for conditioning a coded data signal transmitted from an active sensor, comprising the steps of:
   determining, from the coded data, a time constant, according to which the data were coded, and
   evaluating the received signal according to the determined time constant,
   wherein the signal is a sequence of pulses, some of which are wheel pulses used for determining the wheel speed and others of which are data pulses used for the coded transmission of non-wheel speed data, wherein the wheel pulse is replaced by an auxiliary pulse by the active sensor when the wheel is not rotating.

2. A method according to claim 1, wherein the data are transmitted in a coded state based on differentiable pulses and the time constant is determined by determining the duration of a pulse or the received signal is sampled according to the determined time constant or the determination of the time constant and the evaluation or processing of the received signal are carried out in real time.

3. A method according to claim 1, wherein the auxiliary pulse has a different amplitude than the wheel pulse and essentially the same duration, and wherein the auxiliary pulse and data pulse have essentially equal amplitudes, and wherein an auxiliary pulse has a level that is higher than a first and lower than a second threshold value and a wheel pulse has a level that is higher than the second threshold value, with an error being detected when a third threshold value that is higher than the second threshold value is exceeded.

4. A method according to claim 3, wherein the time measurement for determining the duration of the wheel pulse is started when the second threshold value is exceeded and terminated when the current falls below the first threshold value, and the time measurement for determining the duration of the auxiliary pulse is started when the first threshold value is exceeded and terminated when the current falls below the first threshold value.

5. A method according to claim 4, wherein the duration is determined with a counter that is started when the first threshold value is exceeded, reset and started again when the second threshold value is exceeded, and stopped when the current falls below the first threshold value.

6. A method according to claim 11, wherein the quantity of the data to be received is a function of the wheel speed.

7. A method according to claim 3, wherein the data pulses are sampled when a wheel or auxiliary pulse falls below the first or second threshold value.

8. A method according to claim 1, wherein the received signal has different current levels and the threshold values are current threshold values.

9. A signal conditioning device, comprising:
   a determining device for determining a time constant, according to which data in a data signal were coded, and
   an evaluation device for evaluating the data signal according to the determined time constant,
   wherein said evaluating device includes means for determining wheel speed from a first data pulse in said data signal and wherein other data pulses in said data signal include second data pulses used for the coded transmission of other data, further including means for replacing the first data pulse with an auxiliary pulse when the wheel is standing still.

10. A device according to claim 9, wherein the received signal includes differentiable pulses and the determining device determines the time constant by defining the duration of a pulse, or the evaluation device samples the received signal according to the time constant determined by the determining device.

11. A device according to claim 9, wherein the auxiliary pulse has a different amplitude than the wheel pulse and essentially the same duration.

12. A device according to claim 11, further including a detection device that detects an auxiliary pulse by a level that is higher than a first threshold value and lower than a second threshold value and that detects the first data pulse by a level that is higher than the second threshold value and that detects an error when a third threshold value that is higher than the second threshold value is exceeded.

13. A device according to claim 12, wherein the determining device is designed to determine the duration of the first data pulse by starting the time measurement when the second threshold value is exceeded and terminating it when the current falls below the first threshold value and to determine the duration of the auxiliary pulse by starting the time measurement when the first threshold value is exceeded and terminating the measurement when the current falls below the first threshold value.

14. A device according to claim 13, wherein the determining device exhibits a counter that is started when the first threshold value is exceeded, reset and started again when the second threshold is exceeded, and stopped when the current falls below the first threshold value.

15. A device according to claim 9, wherein the quantity of data in said data signal is a function of the wheel speed.

16. A device according to claim 12, wherein the data pulses are sampled when a wheel or auxiliary pulse falls below the first or second threshold value.

17. A device according to claim 9, wherein the received signal has different current levels and the threshold values are current threshold values.

* * * * *